Jan. 29, 1957  R. D. HORBINSKI  2,779,810

THERMOCOUPLE ASSEMBLY

Filed May 16, 1955

INVENTOR
RICHARD D. HORBINSKI

BY Young and Wright

ATTORNEYS

2,779,810

THERMOCOUPLE ASSEMBLY

Richard D. Horbinski, Milwaukee, Wis.

Application May 16, 1955, Serial No. 508,515

5 Claims. (Cl. 136—4)

My invention relates to temperature measuring apparatuses, and more particularly to a means for attaching a thermocouple in close thermal relationship with the surface to be measured.

Heretofore, when it has been desired to measure surface temperatures of materials, such as, for example, deep freeze and refrigerator wall temperatures, materials being checked through traveling furnaces, drying ovens, block or cylinder head temperatures, boiler pipe temperatures and the like, it has been necessary to prepare the surface in some manner to receive the thermocouple wires. This has usually been accomplished by drilling into the surface and then peening the thermocouple wires thereto or mounting some sort of an adapter for a bayonet spring loaded type of thermocouple or it has been necessary to solder or braze existing button types to the surface, for example, wires fixed to copper buttons and then soldering or brazing the buttons to the surface areas. All of this requires a great deal of work and effort both in preparing the surface and then later removing the thermocouple wires. In fact, so much time and effort is required that wherever the surface is visible it is preferred to use the "Tempil" stick method (i. e. wax melting at a given temperature).

It is, therefore, a primary object of my present invention to provide a thermocouple attachment which may be quickly and easily brought into thermal contact with the surface to be measured and which then can be quickly and easily detached from the surface without the necessity of preparing the surface in any manner.

Another object of my present invention is to provide a thermocouple attachment utilizing a permanent magnet to which the thermocouple is resiliently attached so that the magnet will hold the thermocouple wires or button in close contact with the surface to be measured.

A further important object of my present invention is to provide a permanent magnet to receive an adjustable tube through which the thermocouple wires extend so that the tube length may be adjusted for proper tension with the surface to be measured, and if desired, may extend into a drilled hole or aperture in the surface to be measured.

A salient feature of my invention resides in the provision of a metal keeper which is utilized in conjunction with the permanent magnet so that my thermocouple attachment may be readily and easily secured to non-metallic surfaces of any thickness or type.

A further object of my invention resides in providing a thermocouple attachment which can readily be attached to surfaces that are not visible, making my attachment superior to the "Tempil" stick method and the like.

Still another object of my present invention is to provide a novel means for attaching the metal keeper, or the magnet, to a vibrating surface so that the magnet will not ride or slide along the vibrating material.

A still further object of my present invention is to provide a thermocouple attachment which is of a simple, practical and reliable construction that is economical to manufacture, easy to assemble, and positive in its operation.

With these and other objects in view, and to the end of attaining any other advantages herein appearing, this invention consists in certain features of construction and combination and arrangement of parts, hereinafter described, pointed out in the claims, and illustrated in the drawings.

In the said drawings, Figure 1 is a side elevational view in perspective showing my novel thermocouple attachment prior to its being applied to a surface and in one of its adjusted positions;

Figure 9:
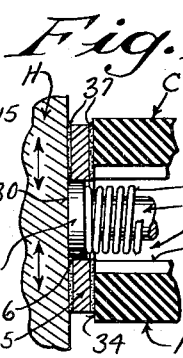
Figure 9 is a view similar to Figure 8 of the drawings showing my thermocouple attachment being applied to a vibrating surface.
Figure 10:
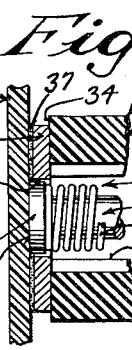
Figure 11:
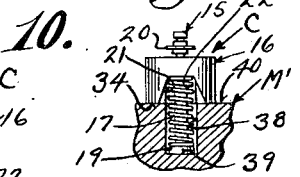

Figure 10 is a view similar to Figure 9 of the drawings illustrating another way of utilizing the metallic keeper when it is desired to attach the thermocouple to a non-metallic surface; and Figure 11 is a reduced side elevational view of my novel thermocouple attachment showing how the same may be adjusted to extend the thermocouple element into an aperture bored into the material for taking temperatures below the surface of the material.

Referring now to the drawings in detail, wherein similar reference characters designate corresponding parts throughout the several views, the letter C generally indicates my new and improved thermocouple attachment and the same includes, broadly, a non-magnetic tube 15, permanent magnet 16, non-magnetic spring 17, thermocouple wires 18, the thermocouple element or button 19, and a retaining true arc non-magnetic snap ring 20.

The magnet 16 preferably is of a circular shape and one end thereof is slotted transversely at 21 to provide the deep recess 22 therein. The opposite end 23 of the magnet is provided with a central bore or aperture 24 which extends longitudinally through the magnet and opens out into the recess 22. Slidably received in the bore 24 is the elongated tube 15 and one end of the tube is provided with the button 19. The tube is made hollow by providing an elongated bore or aperture 25 entirely therethrough. The bore 25 has a reduced end portion 26 extending through and for the thickness of the button 19, and it should be noted that, the thermocouple wires 18 are received in the tube and the insulation 27 is extended entirely through the bore 25 to terminate in close contact with the reduced end portion 26 of the bore.

The two thermocouple wires 28 and 29, respectively, which are connected at one end with the recording instrument (not shown), are bared and brought through the reduced aperture 26 and then brazed, welded, or otherwise secured to the outer surface of the button 19. The solder material or brazed material S completely surrounds the wires 28 and 29 and fills the reduced end portion 26 of the bore 25 so that there is no air space available to interfere with the accurate measurement of the surface to be tested or measured, as better shown in Figure 5. The ends of the wires 28 and 29, which extend to the outer surface of the button 19, are then polished and ground down to present a smooth surface 30, so that, an extremely close contact may be had with the surface to be measured, therefore, resulting in an extremely accurate measurement. It has been found that this close contact gives the accuracy usually found in the bare wire method and is superior to the "Tempil" stick method.

It should be here noted that the polished surface 30 of the thermocouple element or button 19 may be made concave or convex as desired if the surfaces to be measured are so shaped.

The outer periphery of the tube opposite the button 19 is provided with a plurality of the circumferential grooves 31 and the true arc snap ring 20 is provided with an open end 32 so that the ring may be snapped into any one of the grooves 31 to hold the tube in its desired relation with the magnet 16. This snap ring may be of any desired construction but is preferably of the true arc type, being provided with three inwardly directed prongs 33.

Figure 1:
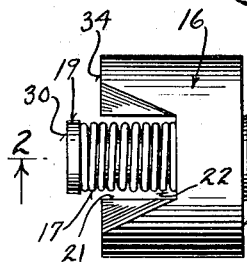
Figure 2:
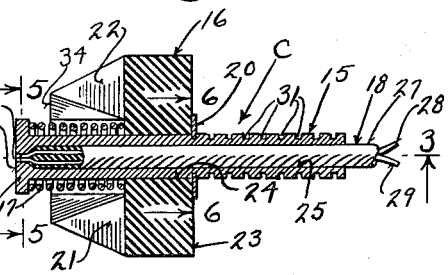
Figure 2 is a longitudinal sectional view taken through the device shown in Figure 1 of the drawings, the section being taken on the line 2—2 of Figure 1 and looking in the direction of the arrows.
Figure 3:
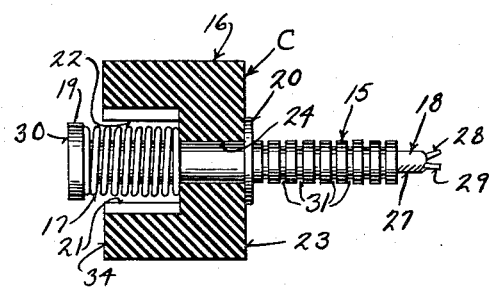
Figure 3 is a longitudinal sectional view taken on the line 3—3 of Figures 2 and 4 of the drawings and looking in the direction of the arrows.
Figure 4:
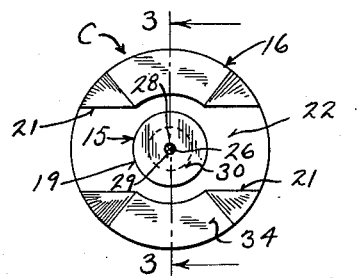
Figure 4 is a front end view of my novel thermocouple attachment.

In the preferred and general use of my novel thermocouple attachment, the snap ring 20 is secured to the innermost groove as shown in Figures 1, 2 and 3 of the drawings so that the button 19 extends slightly beyond the outer surface 34 of the magnet 16. Interposed between the button 19 and the magnet 16 within the recess 22 is the coil or helical spring 17 and the same exerts pressure to constantly urge the button 19 away from the magnet 16 for a purpose which will become readily apparent as the description proceeds.

When it is desired to take the surface temperature of any metallic surface, it is merely necessary to bring the polished surface 30 of the thermocouple element or button 19 into contact with the surface and the attractive force of the magnetic field will draw the magnet against the tension of the spring 17 and into holding relationship with the surface. The helical or coil spring continually exerts force between the inner surfaces of the button and magnet to continually bias the surface 30 of the thermocouple element or button 19 into thermal relationship with the surface of the material to be measured.

Figures 5, 6, 7:
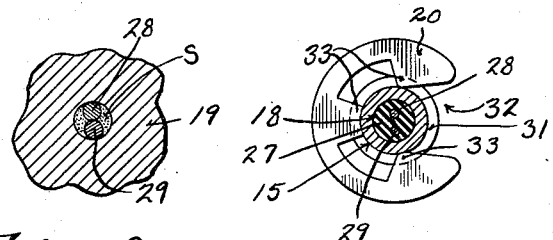
Figure 5 is an enlarged fragmentary sectional view of the thermocouple element showing details of the thermocouple button and wires, the section being represented by the line 5—5 of Figure 2 of the drawings and looking in the direction of the arrows.
Figure 6 is a an enlarged transverse sectional view of my novel thermocouple, the section being taken on the line 6—6 of Figure 2 of the drawings and looking in the direction of the arrows.
Figure 7 is a fragmentary view, partly in section, similar to Figure 3 of the drawings and illustrating how the thermocouple is brought into thermal relation with a non-metallic substance utilizing my novel metal keeper.
Figure 8:
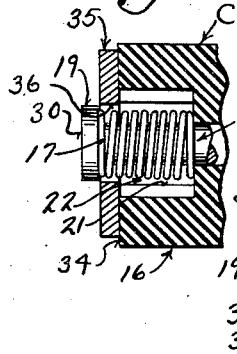
Figure 8 is a fragmentary sectional view similar to Figure 7 of the drawings but showing my metal keeper applied directly to the magnet prior to attaching the magnet to the surface to be measured.

To adapt my thermocouple attachment C to various types of surfaces, i. e., non-metallic surfaces or surfaces that are constantly vibrating or that might cause the magnet to slip and slide along the surface, I provide a novel metallic keeper 35, and this keeper is shaped in the form of a flat metal washer and is provided with a central aperture 36 which is of a slightly larger diameter than the diameter of the button 19 so that, if desired, the button 19 can extend entirely through the keeper 35 as shown more particularly in Figure 8 of the drawings. The metallic keeper 35 is utilized in the following ways: If the material to be measured is of a fairly thin non-metallic substance, the metallic keeper 35 may be placed behind the material M as illustrated in Figure 7 of the drawings and the magnetic field or force will attract or hold the magnet and keeper together through the material M and the thermocouple or button 19 will be in close thermal relationship with the material as shown.

Now, if the material to be meas... the like, i. e., not metal, but of a rel... stance, the metallic washer 35 may be adh... to the surface P and I prefer to use a pressu... adhesive 37, as shown more particularly in Fig... of the drawings, and the magnet is then drawn dn... to the metallic keeper 35 and the thermocouple eleme... 19 will extend through the aperture 36 into close thermal relation to the plastic material P.

Should the material or body H to be measured be of a vibrating nature as shown by the arrows in Figure 9 such as might occur in measuring the block or cylinder head temperatures while the engine is running, the pressure sensitive adhesive 37 may be applied to both sides of the keeper 35 and then the adhesive cooperates with the magnetic force to firmly and steadily hold the thermocouple element or button 19 in close thermal contact with the material or body H as shown more clearly in Figure 9 of the drawings.

If, for some reason, it should be desired to take a temperature reading somewhat below the surface of the material, it is only necessary to provide the material M' with an aperture 38 of a greater diameter than the diameter of the button 19. The tube 15 is then adjusted until the thermocouple element or button 19 will extend to the bottom 39 of the aperture 38 with the end 34 of the magnet 16 spaced slightly above the surface 40 of the material M'. The snap ring 20 is then placed in one of the intermediate grooves 31 and the magnet 16 will snap down to surface 40 and hold the thermocouple element 19 as previously described.

Obviously, to apply my novel thermocouple attachment C to the usual metal surface, the various parts will be in the position shown in Figures 1 to 3, inclusive, and when the polished surface 30 of the thermocouple element 19 engages the surface to be measured, the magnet 16 will snap towards the surface for the desired close thermal relationship.

From the foregoing, it is believed that the features and advantages of my invention will be readily apparent to those skilled in the art, and it will, of course, be understood that changes in the form, proportion and minor details of construction may be resorted to without departing from the spirit of the invention or the scope of the appended claims.

I claim:

1. In a temperature measuring device, a permanent magnet having a circular transverse cross section, an enlarged recess formed in one end of said magnet, a central apertured opening out on the other end of said magnet and opening out into said recess, an elongated hollow tube slidably received in said aperture and extending through said recess, a thermocouple element on one end of said tube adjacent said recess, a spring in said recess exerting pressure between said magnet and said thermocouple element, and means for adjustably holding said tube in a desired relation to said magnet, whereby said thermocouple element may be positioned by the attracting force of said magnet adjacent a body temperature of which is to be measured.

2. A temperature measuring device as set forth in claim 1 wherein the means for adjustably securing the permanent magnet and the hollow tube includes circumferential grooves in said tube, and a snap ring retained in any one of said grooves.

3. In a temperature measuring device a permanent magnet having a circular cross section, said magnet having a wide transverse slot through one end and a central longitudinal opening on the other end of said magnet extending entirely through the body thereof and opening out into said transverse slot, a thermocouple element extending longitudinally through said opening and into said slot, whereby, air is free to circulate in and around said thermocouple element and said magnet, said thermocouple element being so constructed and arranged that the attractive force of said magnet may be employed for positioning said thermocouple element adjacent a body the temperature of which is to be measured, a helical spring exerting force between said thermocouple element and said magnet for biasing said thermocouple element into thermal relationship with the surface of the body.

4. In a temperature measuring device, a permanent magnet having a circular transverse cross section, an enlarged transverse slot formed in one end of said magnet, a central aperture opening out on the other end of said magnet and opening out into said slot, an elongated hollow tube slidably received in said aperture and extending through said slot, a thermocouple element on one end of said tube adjacent said slot, a spring in said slot exerting pressure between said magnet and said thermocouple element, said hollow tube being provided with circumferential grooves above said magnet, and a snap ring retained in and moved to any one of said grooves, whereby said thermocouple element may be adjustably positioned and held by the attractive force of said magnet adjacent the surface the temperature of which is to be measured.

5. In a temperature measuring device, a permanent magnet having a wide transverse recess through one end and a central aperture opening out on the other end and communicating with said transverse recess, a thermocouple element extending centrally through said aperture and into said recess, whereby, air is free to circulate in and around said thermocouple element and said magnet, and a helical spring exerting force between said thermocouple element and said magnet for biasing said thermocouple element into thermal relationship with the surface of a body.

References Cited in the file of this patent

UNITED STATES PATENTS

| | | |
|---|---|---|
| 2,177,837 | Miller | Oct. 31, 1939 |
| 2,194,489 | Woodson | Mar. 26, 1940 |
| 2,476,099 | Knudsen | July 12, 1949 |